US006650616B2

(12) United States Patent
Crawford

(10) Patent No.: US 6,650,616 B2
(45) Date of Patent: *Nov. 18, 2003

(54) TRANSMISSION SECURITY FOR WIRELESS COMMUNICATIONS

(75) Inventor: James A. Crawford, San Diego, CA (US)

(73) Assignee: Magis Networks, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/178,207

(22) Filed: Jun. 24, 2002

(65) Prior Publication Data

US 2003/0026197 A1 Feb. 6, 2003

Related U.S. Application Data

(63) Continuation of application No. 09/710,614, filed on Nov. 9, 2000, now Pat. No. 6,438,367.

(51) Int. Cl.[7] ................................................. H04M 1/66
(52) U.S. Cl. ...................... 370/203; 455/410; 380/274
(58) Field of Search ................................. 370/203, 205; 455/410, 411; 380/270, 274, 271, 272

(56) References Cited

U.S. PATENT DOCUMENTS

| | | |
|---|---|---|
| 5,282,222 A | 1/1994 | Fattouche et al. |
| 5,357,502 A | 10/1994 | Castelain et al. |
| 5,889,759 A | 3/1999 | McGibney |
| 5,901,180 A | 5/1999 | Aslanis et al. |
| 5,914,931 A | 6/1999 | Kang et al. |
| 5,930,231 A | 7/1999 | Miller et al. |
| 5,991,289 A | 11/1999 | Huang et al. |
| 6,074,086 A | 6/2000 | Yonge, III |
| 6,128,276 A | 10/2000 | Agee |
| 6,175,551 B1 | 1/2001 | Awater et al. |
| 6,237,013 B1 | 5/2001 | Usui |

(List continued on next page.)

OTHER PUBLICATIONS

European Telecommunications Standards Institute 2000 (ETSI); "Broadband Radio Access Networks (BRAN); Hiperlan Type 2; Physical (PHY) Layer"; Technical Specification; http://www.etsi.org ; pp. 1–40; ETSI TS 101 475 V1.1.1 (2000–04).

IEEE Computer Society; "Draft Supplement to Standard [for] Information Technology–Telecommunications and Information Exchange Between Systems–Local and Metropolitan Area Networks–Specific Requirements–Part 11: Wireless LAN Medium Access Control (MAC) and Physical Layer (PHY) Specifications: High Speed Physical Layer in the 5 Ghz Band"; IEEE P802.11a/D7.0; Supplement to IEEE Standard 802.11–1999; (1999); pp. 1–90.

(List continued on next page.)

Primary Examiner—Melvin Marcelo
Assistant Examiner—Derrick W. Ferris
(74) Attorney, Agent, or Firm—Fitch Even Tabin & Flannery

(57) ABSTRACT

A method of transmission level security, and a corresponding transmission security system, the method consists of the steps of: forming a plurality of digital signals representing a symbol to be transmitted over a communication medium, wherein respective ones of the plurality of digital signals are modulated onto respective ones of a plurality of subcarriers according to a multiple carrier modulation scheme; and introducing a predetermined group delay distortion in one or more of the plurality of subcarriers, such that portions of the one or more of the plurality of subcarriers will be received outside of a time window corresponding to the symbol at a receiver. In one implementation, an equipped receiver substantially removes the predetermined group delay distortion such that the portions of the one or more of the plurality of subcarrier fit within the time window.

87 Claims, 7 Drawing Sheets

U.S. PATENT DOCUMENTS

| | | | |
|---|---|---|---|
| 6,307,840 B1 | 10/2001 | Wheatley et al. | |
| 6,363,107 B1 | 3/2002 | Scott | |
| 6,438,367 B1 * | 8/2002 | Crawford | 455/410 |
| 2002/0001299 A1 | 1/2002 | Petch et al. | |

OTHER PUBLICATIONS

Holmes, Jack K., "Coherent Spread Spectrum Systems," pp. 350–356, Wiley–Interscience Publication, John Wiley & Sons.

Muschallik, Claus, "Impoving an OFDM Reception Using an Adaptive Nyquist Windowing," Jun. 10, 1996, pp. 259–269, IEEE.

Müller–Weinfurtner et al., "Optimum Nyquist Windowing for Improved OFDM Receivers," Global Telecommunications Conference, 2000, Globecom '00, IEEE, vol: 2, pp. 711–715, 2000.

Sollenberger, N.R. et al., "Receiver Structures for Multiple Access OFDM," Vehicular Technology Conference, 1999 IEEE 49th, vol. 1, 1999, pp.; 468–472.

Stantchev. B. et al., "Time–Variant Distortions in OFDM," IEEE Communications Letters, vol.: 4, Issue: 10, Oct. 2000, pp.: 312–314.

* cited by examiner

TRANSMISSION SECURITY FOR WIRELESS COMMUNICATIONS

This application is a Continuation of U.S. patent application Ser. No. 09/710,614, filed Nov. 9, 2000, entitled "TRANSMISSION SECURITY FOR WIRELESS COMMUNICATIONS", now U.S. Pat. No. 6,438,367, the entirety of which is hereby incorporated by reference.

BACKGROUND OF THE INVENTION

1. Field of the Invention

The present invention relates to security for communication systems and more specifically to transmission level security for communication systems using multiple carrier modulation techniques. Even more specifically, the present invention relates to transmission level security for communication systems using multiple carrier modulation techniques, such as orthogonal frequency division multiplexing (OFDM).

2. Discussion of the Related Art

Security is becoming increasingly important in communications systems which transmit data. Wireline communication systems, such as coaxial cable and especially fiber optic cable, are inherently secure since such mediums must be physically tapped to intercept data transmissions. On the other hand, wireless data transmission is inherently insecure, since data is transmitted openly over an air interface such that an unauthorized entity may easily intercept the transmission. In the context of wireless local area network (LAN) applications, security is extremely important since sensitive data is transmitted to and from multiple devices that constitute the network. Without any security measures, eavesdroppers may freely receive data transmissions between devices in the wireless LAN. As such, transmission security is required to ensure that unauthorized entities are not allowed to intercept the data as it is communicated across the network.

Many bit-level security technologies exist in which the data is encrypted prior to transmission over the wireless medium. Typically, encryption involves scrambling the data bits prior to transmission and the receivers in the network are provided with the logic to decrypt the transmitted information. Common bit-level security techniques include DPF (Data Private Facility) and DES (Data Encryption Standard). These encryption techniques make use of either a Public Key or a Private Key which is used by authorized receivers to decrypt the data. As such, without the key, unauthorized users have a difficult time descrambling the data.

Many bit-level security measures, for example, those used in OFDM (Orthogonal Frequency Division Multiplexed) wireless LAN applications using the HiperLAN2 and IEEE 802.11 standards, offer data payload level encryption to encrypt the data but transmit the preambles and control fields with no protection. Thus, an unauthorized eavesdropper can easily intercept the data, although it is encrypted. Disadvantageously, having received the data, the unauthorized eavesdropper can easily parse the data fields from the PHY-layer communications and possibly reverse engineer the encryption technique and extract the underlying source information.

Another form of security is transmission-level security in which the physical waveform (i.e. PHY-layer) carrying the data is altered according to an encryption technique. Advantageously, since the physical waveform is altered, unauthorized eavesdroppers may not even be able to meaningfully receive the transmitted signal at all. One conventional transmission-level encryption technique includes frequency hopping in which the carrier frequency that carries the data is periodically hopped between several different frequencies in a pseudo random fashion. Unless an eavesdropper is aware of the frequencies used and the hopping pattern, the eavesdropper will be unable to receive the transmitted data.

SUMMARY OF THE INVENTION

The present invention advantageously addresses the needs above as well as other needs by providing a transmission level security technique which introduces a known group delay distortion into the transmitted signaling, which for the unequipped receiver, will interfere with the reception of data at the receiver.

In one embodiment, the invention can be characterized as a method of transmission security in a communication system and a means for accomplishing the method, the method comprising the steps: forming a plurality of digital signals representing a symbol to be transmitted over a communication medium, wherein respective ones of the plurality of digital signals are modulated onto respective ones of a plurality of subcarriers according to a multiple carrier modulation scheme; and introducing a predetermined group delay distortion in one or more of the plurality of subcarriers, such that portions of the one or more of the plurality of subcarriers will be received outside of a time window corresponding to the symbol at a receiver.

In another embodiment, the invention may be characterized as a method of transmission level security in a communication system comprising the steps: forming a plurality of digital signals representing a symbol to be transmitted over a communication medium, wherein respective ones of the plurality of digital signals are modulated onto respective ones of a plurality of subcarriers according to a multiple carrier modulation scheme; and introducing a group delay distortion in one or more of the plurality of subcarriers but less all of the plurality of subcarriers, such that portions of the one or more of the plurality of subcarriers will be received outside of a time window corresponding to the symbol at a receiver.

In yet another embodiment, the invention may be characterized as a method of transmission level security in a communication system comprising the steps: forming a signal to be transmitted over a communication medium; and introducing a predetermined group delay distortion in the signal, such that portions of the signal will be received outside of a time window corresponding to the signal at a receiver.

In another embodiment, the invention may be characterized as a method of transmission level security for time windowed communication systems comprising the steps: receiving a signal, wherein the signal has undergone a predetermined group delay distortion, wherein the predetermined group delay distortion is such that portions of the signal will be received outside of a nominal window of time corresponding to the signal at a receiver; and substantially removing the predetermined group delay distortion from the signal such that the signal fits within the nominal window of time.

In a further embodiment, the invention may be characterized as a transmitter implementing transmission level security for wireless communications comprising: a baseband modulator producing a signal to be transmitted to a receiver; and an encryptor coupled to the baseband modulator for introducing a predetermined group delay distortion in the signal such that portions of the signal will be received outside of a nominal window of time corresponding to the signal at the receiver.

In another further embodiment, the invention may be characterized as a receiver implementing transmission level security for wireless communications comprising: an antenna for receiving a signal, wherein the signal has been undergone a predetermined group delay distortion such that portions of the signal will be received outside of a nominal window of time corresponding to the signal at the receiver; a downconverter coupled to the antenna; and a decryptor coupled to the downconverter for substantially removing the predetermined group delay distortion from the signal such that the signal fits within the nominal window of time.

In another embodiment, the invention may be characterized as a method of transmission level security in a communication system comprising the steps: forming signals to be transmitted over a communication medium; introducing a predetermined group delay distortion in each of the signals, such that portions of the signals will be received outside of a nominal time window corresponding to the signals at a receiver, the predetermined group delay distortion selected from a plurality of predetermined group delay distortions; and changing the predetermined group delay distortion introduced in at least one of the signals to another one of the plurality of predetermined group delay distortions.

In yet another embodiment, the invention may be characterized as a method of transmission level security in a communication system comprising the steps: forming signals to be transmitted over a communication medium; and introducing a predetermined group delay distortion in each of the signals, such that portions of the signals will be received outside of a nominal time window corresponding to the signals at a receiver, the predetermined group delay distortion selected from a plurality of predetermined group delay distortions; wherein the predetermined group delay distortion introduced is hopped between respective ones of the plurality of predetermined group delay distortions.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
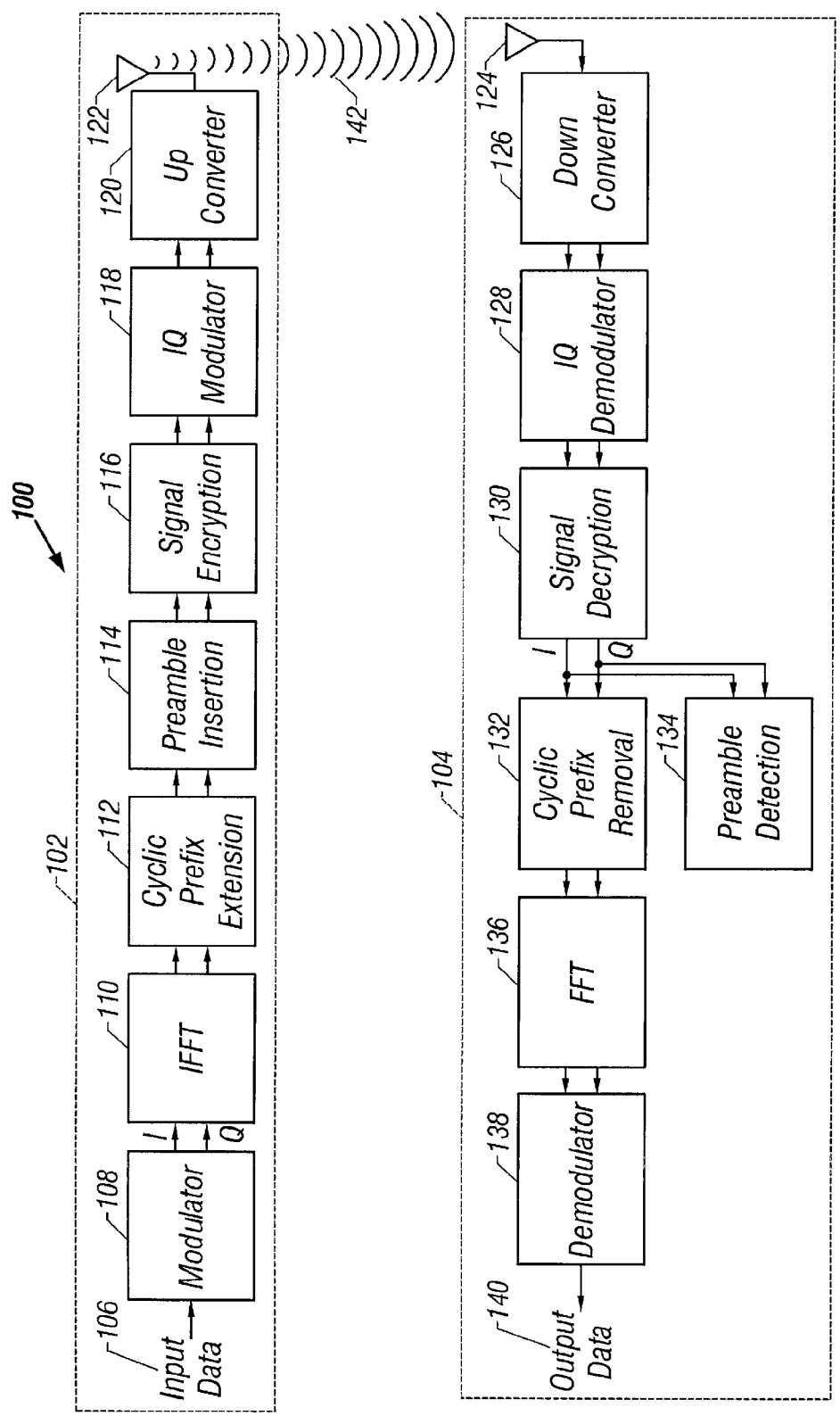
FIG. 1 is a functional block diagram of an orthogonal frequency division multiplexed (OFDM) communication system incorporating a group delay distortion encryption as a transmission-level security technique according to an embodiment of the invention.

Referring first to FIG. 1, a functional block diagram is shown of an orthogonal frequency division multiplexed (OFDM) communication system incorporating a group delay distortion encryption as a transmission-level security technique according to an embodiment of the invention. Shown is a communication system 100 including both a transmitter 102 and a receiver 104. The transmitter 102 includes input data 106, a baseband modulator 108, an inverse fast Fourier transform 110 (hereinafter referred to an inverse FFT 110 or simply IFFT 110), a cyclic prefix extension 112, a preamble insertion 114, a signal encryptor 116, an RF modulator 118, an upconverter 120 and a transmit antenna 122. The receiver 104 includes a receive antenna 124, a downconverter 126, an RF demodulator 128, a signal decryptor 130, a cyclic prefix removal 132, a preamble detector 134, a fast Fourier transform 136 (hereinafter referred to as FFT 136), a baseband demodulator 138, and output data 140 (also referred to as extracted data 140). Further illustrated is signaling 142 traveling over a communication medium.

Within the transmitter 102, the input data 106 is input into the baseband modulator 108, which is coupled to the IFFT 110. The IFFT 110 is coupled to the cyclic prefix extension 112 with is coupled to the preamble insertion 114, which is coupled to the signal encryptor 116. The signal encryptor 116 is coupled to the RF modulator 118, which is coupled to the upconverter 120, which is coupled to the transmit antenna 122. The transmit antenna 122 is coupled to the receive antenna 124 via the communication medium. Within the receiver 104, the receive antenna 124 is coupled to the downconverter 126, which is coupled to the RF demodulator 128, which is coupled to the signal decryptor 130. The signal decryptor 130 is coupled to both the cyclic prefix removal 132 and the preamble detector 134. The cyclic prefix removal 132 is then coupled to the FFT 136, which is coupled to the baseband demodulator 138, which outputs the output data 140.

In operation, the communication system 100 employs a transmission level security encryption technique in accordance with an embodiment of the invention. In accordance with this embodiment, a signal encryptor is used to introduce a group delay distortion in the digital baseband signals prior to being modulated to RF and transmitted over the communication medium. The introduction of the group delay distortion advantageously is a PHY-layer encryption of the waveform that is being transmitted such that at least portions of the RF carriers transmitted by the transmitter arrive at the receiver outside of the expected time window required for the FFT 136 of the receiver 104. Advantageously, according to this embodiment, the receiver 104 is equipped with such a signal decryptor 130 that removes this group delay distortion from the received digital baseband signals such that at least the portion of the RF carriers that would have been pushed outside of the expected time window of the FFT 136 (of a non-equipped receiver) will be adjusted back to fit within the expected time window. Advantageously, a receiver not equipped with such a signal decryptor 130 will be unable to adequately receive the signaling from the transmitter. This transmission level security measure is referred to as time dispersion signal encryption or TDSE.

Furthermore, in accordance with several variations of this embodiment, there are two different levels of TDSE. First, a group delay distortion having a peak-to-peak variation greater than the guard time interval associated with each data symbol is introduced such that unauthorized receivers will be able to receive the preamble, i.e., the control structures associated with the transmitted data, but will not be able to receive the data portion of the signaling or the data symbols. This PHY-level encryption technique may easily be used in combination with known bit-level encryptions, such as DES, for added security. Thus, advantageously, this PHY-level encryption technique is preferable to bit level encryptions alone because in accordance with this technique, an eavesdropper will not even be able to recover the data bits at all, and is preferably used in conjunction with a bit-level encryption. With most bit-level encryptions, the eavesdropper can at least receive the scrambled data bits. Although these received data bits are encrypted, for example, the eavesdropper may still be able to reverse engineer the encryption and recover the data. Advantageously, in this embodiment, the eavesdropper simply can not receive the data bits at all, even if transmitted without any bit level encryption.

The second level of TDSE is to introduce a larger group delay distortion such that an eavesdropper can not even detect and receive the preamble of the data frames. Typically, the peak-to-peak variation of the group delay distortion is greater than half of the length of the preamble that is used for signal detection, timing synchronization and estimation of the frequency offset. Thus, the eavesdropper can not even acquire the signaling or lock on to the frequency and timing of the signaling, i.e. the eavesdropper is powerless to recover the preamble or the transmitted data.

In preferred embodiments, this transmission level security technique is employed in wireless LAN applications, e.g., indoor wireless LAN applications. In these systems, multiple wireless devices transmit and receive sensitive data. Multiple carrier modulation schemes are advantageous over single carrier modulations in these applications. A conventional single carrier transmission scheme sends only one signal at a time using one radio frequency. On the other hand, a multiple carrier transmission scheme transmits parallel signals concurrently on multiple frequencies. This results in an efficient use of the bandwidth and provides robust communications in the presence of noise, interference and multipath. Thus, multicarrier modulations perform well in the extremely harsh multipath environment of an indoor wireless LAN application.

Recently, orthogonal frequency division multiplexing (OFDM) has been applied in the application of the wireless LAN. OFDM is a type of multiple carrier modulation that encodes data on multiple frequency carriers (also referred to as subcarriers) that are chosen to be orthogonal such that at the frequency that each of the multiple carriers is evaluated, the frequency of the other carriers is at zero. It is important that this orthogonality be preserved so that the receiver 104 can accurately extract the data from the multiple carriers. In order to do this, the transmitter and the receiver should be perfectly synchronized and the multipath needs to be adequately reduced. OFDM modulation handles the multipath channel of the indoor environment by repeating the tail of each data symbol and preceding the data symbol with the repeated portion. This introduces a guard time prior to each data symbol. The guard time is typically greater than the time it takes for the transient (i.e. the multipath) to decay. OFDM technology is well known to those skilled in the art. OFDM for wireless LAN applications has been standardized in the IEEE 802.11a standard (in the U.S.) and HiperLAN2 standard (in Europe). These are physical (PHY) layer standards that, at best, offer only data payload level encryption (i.e. bit-level encryption) while the control structures are transmitted "in the clear".

Figure 2:
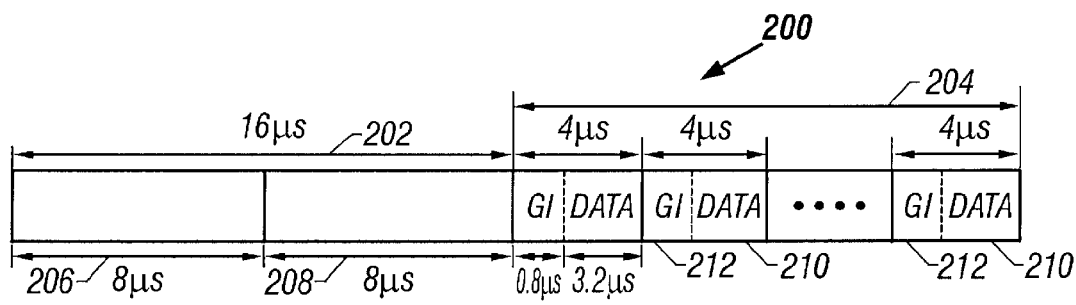
FIG. 2 is a diagram of the PHY-layer frame structure for the IEEE 802.11a standard used in orthogonal frequency division multiplexed (OFDM) communications.

Referring briefly to FIG. 2, a diagram is shown of the PHY-layer frame structure for the IEEE 802.11a standard used in orthogonal frequency division multiplexed (OFDM) communications. Shown is a frame 200 having a preamble 202 and a data portion 204. The preamble includes a short symbol portion 206 and a long symbol portion 208. The data portion 204 includes multiple symbols 210 (also referred to as OFDM symbols 210), each symbol 210 having a guard time interval 212 preceding it. The frame 200 is also referred to as a PHY-layer frame or a medium access control (MAC) frame.

According to these standards, the preamble 202 is chosen which is well suited to measuring frequency errors quickly in the communication system, but is substantially less ideal for measuring precision time of signal arrival. As is well known in the art, the short symbol portion 206 is used for signal detection, diversity selection, coarse frequency offset estimation, and timing synchronization. The long symbol portion 208 is used for channel estimation and fine frequency offset estimation. Following the preamble 202, each OFDM symbol 210 consists of a properly time-windowed set of modulated subcarriers (e.g., sine waves) and a guard time interval 212. This guard time interval 212 is utilized to allow the communication channel's transient to decay before transmitting the next OFDM symbol 210. According to the IEEE 802.11a standard, this guard time interval 212 is 0.8 $\mu$s and the symbol 210 length is 3.2 $\mu$s. According to the HiperLAN2 standard, the guard time interval 212 is 0.4 $\mu$s or 0.8 $\mu$s while the symbol 210 length is 3.2 $\mu$s. As such, the guard time interval 212 is long enough such that all reflections of the transmitted symbol 210 are adequately reduced prior to transmission of the next OFDM symbol 210. Again, the guard time interval 212 and the frame structure of the IEEE 802.11a standard are well known in the art.

The following discussion uses the wireless LAN application using OFDM modulation under the IEEE 802.11a and HiperLAN2 PHY-layer standards having the frame 200 of FIG. 2 to describe several embodiments of the invention. The input data 106 to be transmitted to one or more receivers, e.g., receiver 104, is input into the baseband modulator 108 which modulates the data into digital baseband signals, i.e., I and Q signals, as is known in the art. For example, the baseband modulator 108 may use, but is not limited to, binary quadrature phase shift keying (BPSK), quadrature phase shift keying (QPSK), or quadrature amplitude modulation (QAM). These digital baseband signals are input to the IFFT 110 which transforms the frequency domain digital baseband signals to time domain digital baseband signals. These signals are coupled to the cyclic prefix extension 112, which adds a guard time interval 212 to the beginning of each OFDM data symbol 210. This guard time interval 212 is an extension of the tail of each data symbol 210 that is made to precede each data symbol. Advantageously, this guard time interval 212 is purposely made longer than the time it takes for the transient due to reflections for a particular data symbol 210 to decay prior to the transmission of the next OFDM data symbol. In accordance with the IEEE 802.11a standard, the guard time interval 212 is 0.8 $\mu$s while the symbol 210 length is 3.2 $\mu$s. Next, the digital baseband signals are coupled to the preamble insertion 114, which inserts an appropriate preamble 202 in front of a set of OFDM data symbols, each OFDM data symbol 210 having a guard time interval 212 associated therewith. Each preamble 202 and set of OFDM data symbols 210 comprise one frame 200, e.g., one MAC frame.

Next, the digital baseband signals, i.e., the baseband OFDM signals, are passed through the signal encryptor which introduces the time dispersion signal encryption (TDSE) in accordance with several embodiments of the invention. Thus, the signal encryptor 116 introduces a group delay distortion in one or more of the individual subcarriers (e.g., sine waves) of each OFDM data symbol. According to one embodiment, the peak-to-peak group delay distortion introduced is no less than the guard time interval 212 prepended to each OFDM data symbol 210. This will allow an eavesdropper to detect the preamble 202, but not to receive the data bits themselves. According to another embodiment, a much larger peak-to-peak group delay distortion is introduced, which will prevent the autocorrelator of the eavesdropper's receiver from even being able to properly detect and obtain the preamble 202 of the frame 200.

Furthermore, the signal encryptor 116 does not have to introduce this group delay distortion in all of the subcarriers of the OFDM data symbols. For example, the signal encryptor 116 may introduce a +0.7 $\mu$s group delay distortion in one subcarrier (e.g., sine wave) of the OFDM data symbol, a +0.2 $\mu$s group delay distortion in another subcarrier of the OFDM data symbol, and a −0.5 $\mu$s group delay distortion in yet another of the subcarriers of the OFDM data symbol, while not introducing a group delay distortion in the remaining subcarriers. Advantageously, since each of the these subcarriers need to be received within a specific time window at the FFT 136 of the receiver 104, some of the subcarriers will be pushed out of the FFT's effective time window (i.e., the nominal window of time of the Fourier transform). It is preferable that the peak-to-peak group delay distortion is greater than the guard time interval 212 of the symbol 210, in this case, the peak-to-peak group delay distortion is 1.2 $\mu$s. This will cause frequency bin splattering due to loss of orthogonality at the FFT 136. Therefore, the FFT 136 will be unable to accurately receive the transmitted data symbols.

In preferred embodiments, the signal encryptor 116 includes one or more digital programmable all-pass filters which can be programmed to introduce a variable amount of group delay. Such all-pass filters are advantageously linear filters, such as infinite impulse response (IIR) filters, that will not add any non-linearities or amplitude distortions into the signaling. In some embodiments, the signal encryption involves a cascade of all-pass filters. Further details of the signal encryption will be described below.

Next, the OFDM signal is modulated by the IQ modulator 118 and upconverted to radio frequency (RF) by the upconverter 120 and transmitted via the transmit antenna 122 over the communication medium.

At the receiver 104, the signaling 142 is received at the receive antenna 124, downconverted at the downconverter 126, and demodulated to baseband at the IQ demodulator 128. It is at this point that a receiver equipped with a corresponding signal decryptor can compensate for the TDSE, i.e., the group delay distortions introduced at the transmitter. For the moment, assume that no signal encryption took place at the transmitter 102, then the baseband signal would be coupled to the preamble detector 134 and the cyclic prefix removal 132. The preamble detector 134 conventionally uses an autocorrelation algorithm which detects the presence of the signaling, estimates the frequency error of the received signaling, and also synchronizes with the timing of the preamble. According to the IEEE 802.11a standard, the short symbol portion 206 is used for this purpose. The cyclic prefix removal 132 removes the guard time interval 212 that was inserted at the cyclic prefix extension 112 of the transmitter 102. As such, the guard time interval 212 accounts for normal time dispersion of the symbol which is introduced by the channel. This time-windows the received signaling into discrete windows of time, each containing one OFDM data symbol 210. According to OFDM transmissions, each OFDM data symbol 210 comprises a properly time-windowed set of subcarriers.

Next, the time-windowed digital baseband signal is input to the FFT 136 which is used to convert the time domain digital baseband signal into its equivalent frequency domain digital baseband signal. As is known, the FFT 136 operates according to defined windows of time. Furthermore, the OFDM waveform is designed such that the subcarriers representing each OFDM data symbol are all contained within this window of time and orthogonality is maintained. If the timing between the transmitter and the receiver is misaligned by more than the guard time interval, one or more of the subcarriers will be pushed outside of the time window and there will be loss of orthogonality and frequency bin splattering will occur within the FFT 136. This results in significant bit error rates, which depending on the severity of the time misalignment, will cripple the receiver's ability to recover the data 140 from the baseband demodulator 138. Thus, the timing synchronization between the transmitter 102 and the receiver 104 is critical to OFDM reception.

In order to compensate for the group delay distortions introduced at the transmitter 102, the receiver includes a signal decryptor 130. The signal decryptor 130 includes one or more all-pass filters that will remove the group delay distortion introduced into the received signaling. The all-pass filters are preferably the inverse of the one or more all-pass filters used in the signal encryption in the transmitter 102. The specific filtering used in the signal encryption and the inverse filtering used in the signal decryption is further described below with reference to FIGS. 4 through 7.

Furthermore, although this embodiment is described in the of OFDM modulation within a wireless LAN application, it is appreciated that the transmission level encryption may be applied to any communication system which uses a Fourier transform, e.g., a fast Fourier transform (FFT) and a discrete Fourier transform (DFT), at the receiver. As such, this embodiment, and other embodiments, apply to many single carrier modulation communications, and other multiple carrier modulation communication systems. As long as the receiver used evaluates the received signaling within discrete windows of time, a PHY-layer encryption technique which introduces a group delay distortion in the carrier or carriers such that at least a portion of the carrier or carriers arrive outside of the expected time window will effectively disrupt the recovery of the data.

It is also noted that several embodiments of the invention are effective in a spread spectrum system or direct sequence spread spectrum (DSSS) system, such as code division multiple access (CDMA). Such spread spectrum systems rely upon the correlation properties of the underlying spreading codes used to spread the narrowband signal into a wideband signal. The introduction of a group delay distortion into such signaling can severely degrade the correlation properties of a non-equipped receiver and also disrupt the pseudo random code tracking loops in the receiver by introducing biases and multiple false-correlation sidelobes. It is well recognized in the art that group delay distortion adversely impacts the performance of a DSSS system.

Figure 3A:
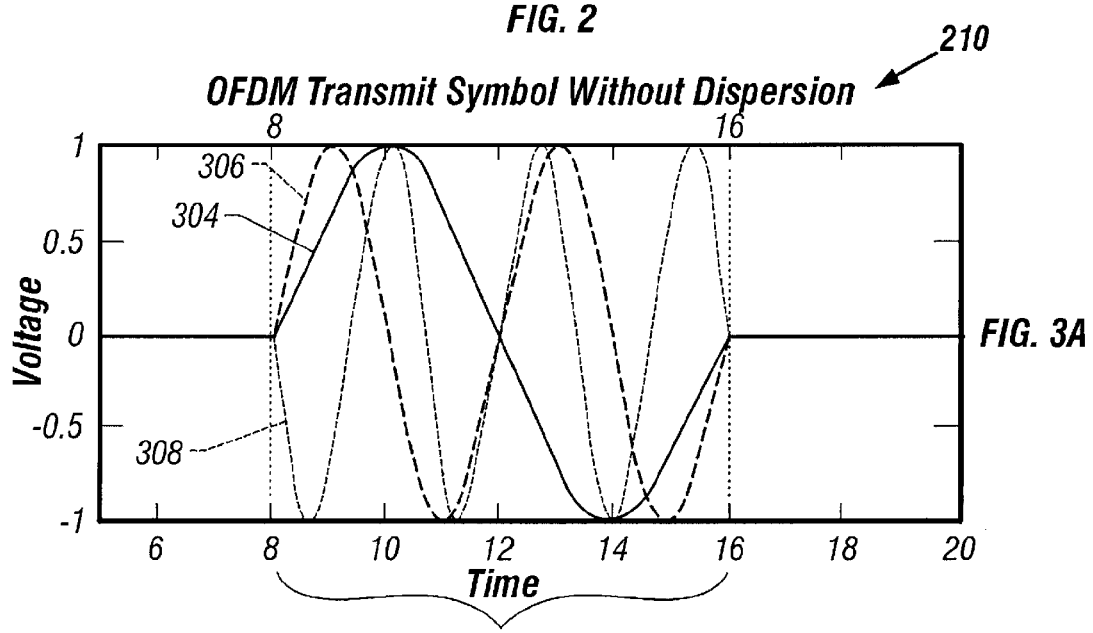
FIG. 3A is a graphical representation of the orthogonal frequency division multiplexed (OFDM) waveform of a transmit symbol prior to encryption in which all carriers are properly contained within the appropriate time window.

Referring briefly to FIG. 3A, a graphical representation is shown of the orthogonal frequency division multiplexed (OFDM) waveform of the transmit data symbol 210 prior to encryption in which all subcarriers are properly contained within the appropriate time window. Illustrated is an OFDM data symbol 210 properly contained within a time window 302. The OFDM data symbol 210 comprises a set of properly time-windowed subcarriers 304, 306, and 308 (also referred to as carriers or sine waves 304, 306 and 308). This is an ideal OFDM data symbol 210 prior to the introduction of group delay distortions at the signal encryptor, and also prior to the insertion of the guard time interval 212 at the cyclic prefix extension. Thus, the OFDM data symbol 210 is shown as output from the IFFT 110 of FIG. 1.

Figure 3B:
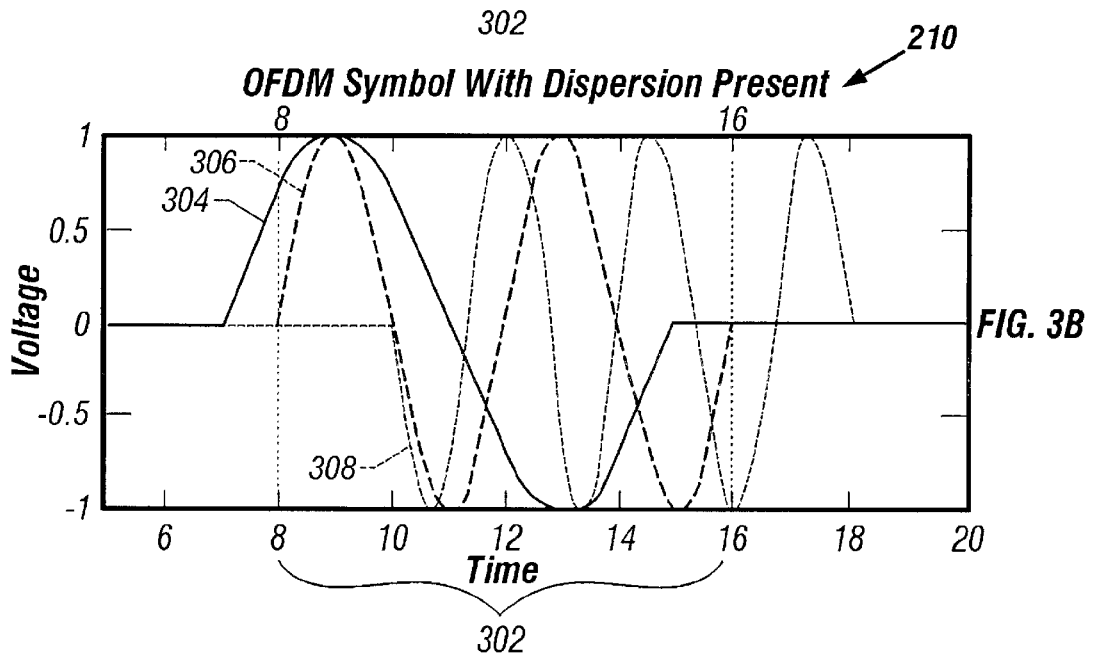
FIG. 3B is a graphical representation of the orthogonal frequency division multiplexed (OFDM) waveform of the transmit symbol of FIG. 3A after encryption by introducing a group delay distortion greater than half the guard time interval to some of the carriers such that the distorted carriers are forced outside of the appropriate time window, thereby creating significant loss of orthogonality in a conventional OFDM receiver.

Referring briefly next to FIG. 3B, a graphical representation is shown of the orthogonal frequency division multiplexed (OFDM) waveform of the transmit symbol 210 of FIG. 3A after encryption by introducing a peak-to-peak group delay distortion greater than the guard time interval 212 to some of the subcarriers such that the distorted subcarriers are forced outside of the appropriate time window 302, thereby creating significant loss of orthogonality in a conventional OFDM receiver. Note that subcarriers 304 and 308 have undergone a group delay distortion, while subcarrier 306 was undistorted. As such, subcarrier 304 was advanced while subcarrier 308 was retarded in time such that at least portions of the respective subcarriers 304 and 308 are "pushed" outside of the time window 302 that will be used by the FFT of the receiver. Note that although a single subcarrier may be advanced or retarded less than the guard time interval and still impair the receiver's ability to receive the data as long as the peak-to-peak group delay distortion is greater than the guard time interval. It is noted that the OFDM receiver has a limited provision for time dispersions caused by the communication medium which is handled by the guard time interval itself; however, the receiver is unable to deal with time dispersion beyond a certain point. As shown, if the dispersion is great enough (as illustrated in FIGS. 3A and 3B), some of the OFDM subcarriers, i.e. sine waves, will improperly begin after the front-edge of the time window 302 of the receiver while others will end prior to the back-edge of the time window 302 of the receiver. In either case, the signal discontinuity and absence of an integral number of subcarrier cycles will destroy the subcarrier orthogonality which will cause spectral splattering in the FFT and signal reception will be greatly harmed. Thus, the illustrated OFDM data symbol 210 of FIG. 3B is shown after the removal of the guard time interval 212 at the cyclic prefix removal 132 and prior to input to the FFT 136.

One key to making this transmission level security work is to cause the signal level dispersion such that significant signal energy falls outside of the time window 302 that the receiver must observe for each OFDM symbol 210. This is illustrated in FIG. 3B wherein subcarriers 304 and 308 fall outside of the time window 302 and will be described further below.

Figure 4:
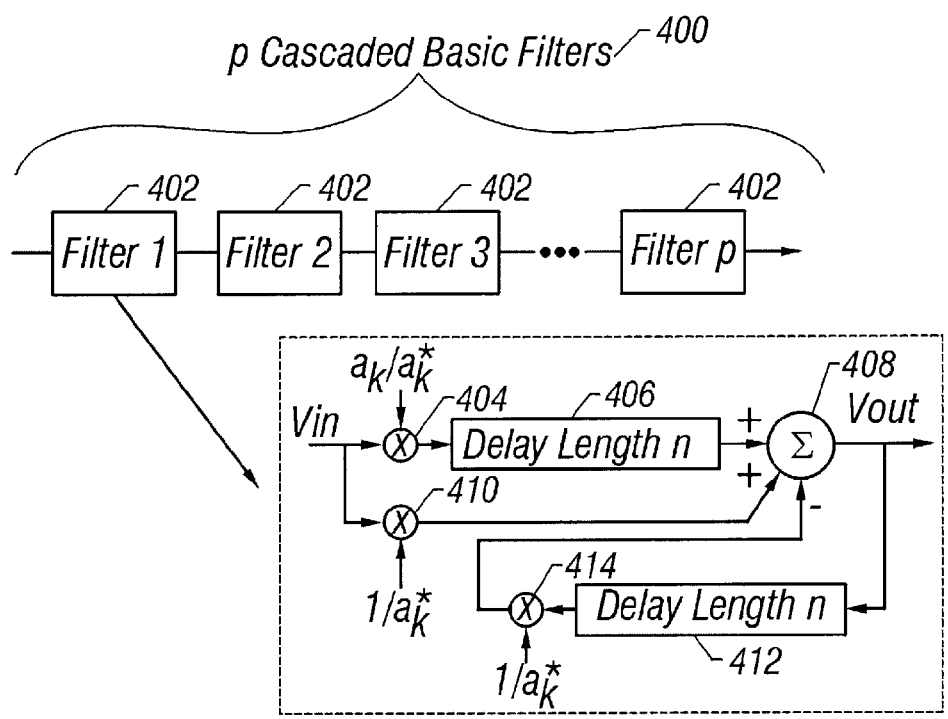
FIG. 4 is a functional block diagram of the signal encryption of FIG. 1 implemented as a cascade of all-pass digital filters in accordance with another embodiment of the invention.

Referring next to FIG. 4, a functional block diagram is shown of the signal encryption of FIG. 1 implemented as a cascade of all-pass digital filters in accordance with another embodiment of the invention. Illustrated is a cascade 400 of digital all-pass filters 402 labeled as filter 1 through filter p. One way to impress (and remove) a non-constant group delay characteristic on the transmitted signal (from the received signal) is to use programmable all-pass filters 402 (also referred to as time-dispersive all-pass filters). At a minimum, the peak-to-peak group delay variation imposed should be at least as large as the guard time interval as described above. Taking this tact will largely interfere with any detection and synchronization methods that make use of the guard time interval or cyclic extension interval because of the spectral splattering or smearing introduced.

Also illustrated in FIG. 4 is the structure within each of the all-pass filters 402, which is shown as an infinite impulse response (IIR) filter. The input digital baseband signal (shown as $V_{in}$) is multiplied at multiplier 404 with the tap weight $a_k$ divided by the conjugate of the tap weight $a_k$, which is input into a delay 406 of length n. The output of delay 406 is input to summer 408. The input digital baseband signal is also multiplied at multiplier 410 with 1 divided by the conjugate of the tap weight $a_k$ and output to the summer 408. The output of the summer 408 (shown as $V_{out}$) is fed back through delay 412 and then multiplied at multiplier 414 with 1 divided by the tap weight $a_k$ which is subtracted at summer 408. The operation of such a filter design is well understood in the art of digital filters and; thus, no further explanation is provided. Furthermore, by selecting appropriate coefficients, the delay can be varied accordingly. Additionally, it is noted that the illustration of the all-pass filter 402 is one embodiment, the skilled artist will recognize that such all-pass filter may be embodied multiple ways.

In the continuous time domain, a cascade 400 of M first-order all-pass filters 402 can be used and represented as:

$$Dly(F) = \prod_{i=1}^{M} \frac{1 + j2\pi(f - f_i)\tau_i}{1 - j2\pi(f - f_i)\tau_i} \quad \text{Eq. (1)}$$

where Dly(f) is the delay introduced by the cascade 400 of all-pass filters 402, p is the number of all-pass filters 402, f is frequency, and $f_i$ is the center frequency of the ith all-pass filter.

In the digital domain however, the all-pass filter cascade 400 takes the form of:

$$H(z) = \frac{\sum_{i=0}^{N-1} c_i z^{N-i}}{\sum_{j=0}^{N-1} c_j z^{-j}} \quad \text{Eq. (2)}$$

where $z=\exp(j2\pi T_s)$, and $c_i$ represents the tap weights or coefficients for the ith all-pass filter. In this formulation, $T_s$ is the time interval between digital baseband I and Q samples. In one embodiment, $T_s$ is 40 MHz or 20 MHz, or 25 nsec and 50 nsec respectively. It is noted that the cascade 400 of all-pass filters 402 represented in Eq. (2) is an infinite impulse response (IIR) filter, the poles can significantly affect the transient response duration of the filter, but to first-order, the filter memory is at a minimum of $NT_s$, where N is the number of samples. At the highest sampling rate of 40 MHz, 0.80 μsec* 40 MHz=32 samples.

Advantageously, since the all-pass filters are linear filters, the cascade 400 of all-pass filters 402 does not introduce any non-linearities or amplitude distortions into the signaling in a transmit spectrum sense. Thus, the signal encryption appears transparent to the signaling. Additionally, such a filter design is easily digitally implemented using an ASIC or a DSP, for example.

Additionally, according to one embodiment, the signal encryption hops between the all-pass filters 402. For example, once every MAC frame (e.g., frame 200), a different group delay characteristic is impressed upon the transmitted data symbols (e.g., symbols 210). This is typically done with a pseudo random number generator that is used to switch between the delay characteristics of the cascade 400. A corresponding pseudo random number generator is used at each receiver in the network in order to switch between all-pass filters in a cascade 400 of all-pass filters that are the inverse of the all-pass filters 402. This embodiment affords an even greater level of security since the eavesdropper must not only know the specific group delay introduced into one or more of carriers of the OFDM data symbol, but also know many specific group delay characteristics and the pattern that they change on a frame-by-frame basis.

In designing an exemplary cascade 400 of all-pass filters 402 according to a preferred embodiment, the following criteria should be observed. First, the peak-to-peak variation of the group delay distortion should be greater than the guard time interval 212 between OFDM data symbols 210. This will interfere with normal OFDM demodulation as described above. For example, according to the IEEE 802.11a standard, the peak-to-peak variation of the group delay distortion should be greater than 0.8 μsec. Second, the peak-to-peak variation of the group delay distortion should be greater than the guard time interval in order to smear signal energy well into the guard time interval. Thus, there should be enough energy dispersion in time so as to fill in the guard time intervals sufficiently. Third, in order to provide a level of encryption when all-pass filters are randomly switched in between, a set of sufficiently different non-flat group delay characteristics should be created and used such that even if the receiver makes the wrong selection of correcting all-pass filters, there will still be spectral splattering in the FFT of the receiver. And, fourth, the cascade 400 of all-pass filters 402 should be digitally implemented in a digital application specific integrated circuit (ASIC).

As discussed above, in order to interfere with data reception, but not interfere with preamble detection, the peak-to-peak group variation in the group delay distortion should be greater than the guard time interval. For example, in IEEE 802.11a, the peak-to-peak variation in the group delay distortion should be greater than 0.8 μsec. In order to interfere with preamble detection, the peak-to-peak group delay distortion should be much greater than the guard time interval, for example, greater than half of the length of the portion of the preamble that is used for preamble detection, timing synchronization and frequency offset estimation. In the IEEE 802.11a standard, this portion of the preamble is called the short symbol portion 206 and is 8 μsec in length. Thus, the peak-to-peak group delay distortion should be greater than 4 μsec. The first level of encryption is preferable since a new user of the network, e.g., in a wireless LAN application, may easily enter the network by acquiring the preamble in transmitted signaling. However, in the second level of encryption where the user can not receive the data or the preamble, the new user has a difficult time joining the network, since the user can not acquire the timing, unless preprogrammed with the appropriate signal decryption, i.e., the appropriate cascade of inverse all-pass filters and the algorithm to switch therebetween.

In preferred embodiments, it is not enough that the encryption system look only at the peak-to-peak variation in the group delay distortion. The cascade 400 of all-pass filters 402 should disperse sufficient energy outside of the nominal time window 302 of the receiver's FFT. As such, transmission security for OFDM is achieved by purposely spreading sufficient spectral energy outside the nominal OFDM symbol time (e.g., the nominal window of time for the symbol) such that the guard time interval can not adequately mitigate the group delay distortion. The amount of signal energy dispersion is variable, depending, for example, on the type of modulation format used. A sufficient metric of this energy dispersion or delay spread is calculated as a standard deviation of the group delay distortion based upon this energy dispersion. This is expressed mathematically as:

$$\tau_{ave} = \frac{\int_0^\infty S(f)\tau(f)df}{\int_0^\infty S(f)df} \quad \text{Eq. (3)}$$

$$\sigma_\tau = \sqrt{\frac{\int_0^\infty S(f)[\tau(f) - \tau_{ave}]^2 df}{\int_0^\infty S(f)df}} \quad \text{Eq. (4)}$$

where S(f) is the power spectral density of the OFDM signal, $\tau_{ave}$ is the mean group delay, τ(f) is the group delay at frequency f, and $\sigma_\tau$ is the standard deviation of the group delay ($\sigma_\tau$ is also referred to as the delay spread of the group delay distortion). If $\sigma_{96}$ is less than the period of the guard time (i.e., the guard time interval), then no substantial transmission-level security is accomplished aside from the additional group delay spread that may be introduced by the channel. If $\sigma_\tau$ is greater than the period of the guard time, then a very effective transmission-level security is provided. However, in some embodiments, it is preferred to have $\sigma_\tau$ greater than the guard time interval, but as small as possible.

Generally, it is desired to disperse sufficient signal energy outside of the timing window of the selected signal feature. Thus, the delay spread $\sigma_\tau$ should be at least 10% of the time duration of the signal feature to be encrypted, preferably at least 20%, more preferably at least 30%, and most preferably at least 50%. As described above, for OFDM signal encryption of a data symbol, it is desired that the delay spread of the group delay distortion, i.e., $\sigma_\tau$, be greater than the guard time interval 212 of an OFDM symbol 210. In this case, the delay spread is at least about 25% of the time duration of the signal feature (e.g., at least the 0.8 $\mu$sec of the 3.2 $\mu$sec OFDM symbol in accordance with the IEEE 802.11a standard, which corresponds to the 0.8 $\mu$sec guard time interval prepended to the OFDM symbol). In the case where the signal feature to be encrypted is the preamble or in OFDM, the portion of the preamble used for timing synchronization and frequency offset estimation, i.e., the 8.0 $\mu$sec short symbol portion 206, then the delay spread should also be at least 10% to at least 50% of the time duration of the particular signal feature. For example, in this case, the delay spread $\sigma_\tau$, is at least 50% of the time duration of the signal feature (e.g., at least 4.0 $\mu$sec of the 8.0 $\mu$sec short symbol portion 206). Thus, as illustrated using the specific example of the OFDM waveform, the delay spread of the group delay distortion introduced into the signaling should be such that sufficient signal energy is dispersed in time from the nominal window of time for the signal feature to be encrypted. And this occurs when the delay spread is at least 10% to at least 50% of the time duration of the signal feature to be encrypted. This results in frequency bin splattering in a Fourier transform of a non-equipped receiver.

It is noted that this applies to other multiple carrier and single carrier communications, in that a group delay distortion is introduced for a transmission level security such that the non-equipped receiver's ability to adequately intercept the signaling will be impaired. In such general cases, the signal feature of the signal to be encrypted may be a symbol, a preamble, a direct sequence spread spectrum (DSSS) chip, etc. An effective transmission level security is created when the delay spread, as defined above, of the group delay distortion is at least 10% of the time duration of the signal feature, preferably at least 20%, more preferably at least 30%, and most preferably at least 50% (at least 10% to at least 50%). As such, it is noted that the optimal amount of the delay spread of the group delay distortion is variable depending on the type of signal, e.g., OFDM, CDMA, etc., and also the signal feature of the signaling. It is noted that in the case of the signal feature being a DSSS chip, the delay spread should be at least 100% of the length of the DSSS chip.

With respect to OFDM, in terms of the individual OFDM subcarrier C/N ratio (carrier to noise ratio), the CNR to achieve a 10% symbol error rate is given in Table 1 below for different modulation formats (e.g., binary phase shift keying (BPSK), quadrature phase shift keying (QPSK), quadrature amplitude modulation (16-QAM and 64-QAM)). Table 1 assumes the IEEE 802.11a waveform with the active symbol portion of 3.2 $\mu$sec and a guard time interval of 0.8 $\mu$sec.

TABLE 1

| Constellation | C/N, dB |
|---|---|
| BPSK | −0.8 |
| QPSK | 2.2 |
| 16-QAM | 12.2 |
| 64-QAM | 18.8 |

Figure 5A:
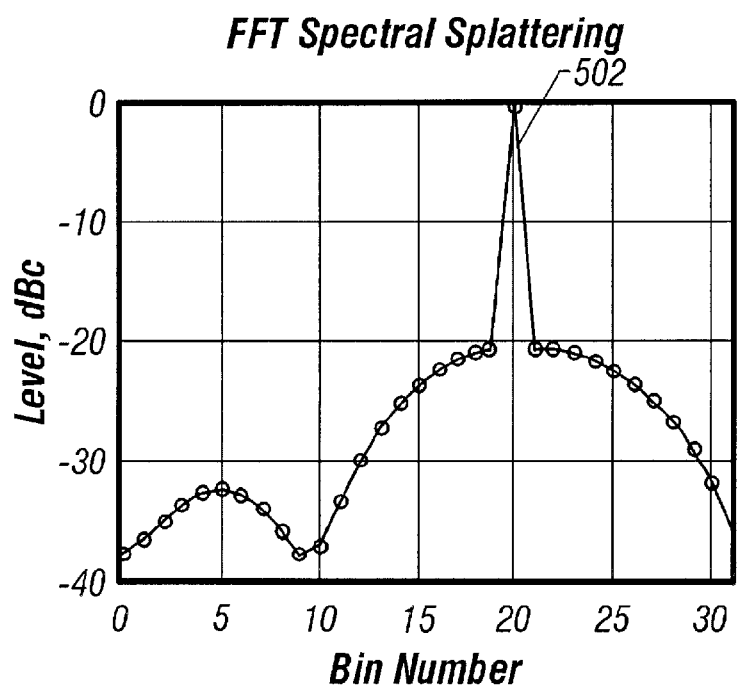
FIG. 5A is a graphical representation illustrating frequency bin splattering within a Fourier transform when one orthogonal frequency division multiplexed (OFDM) subcarrier is delayed (or advanced) 10% beyond a guard time interval.

The 10% symbol error rate (SER) is a safe guideline at which the system begins to break due to the additional group delay encryption applied. Briefly referring next to FIG. 5A, a graphical representation is shown which illustrates frequency bin splattering within a Fourier transform. FIG. 5A illustrates when a single OFDM subcarrier is delayed (or advanced) 10% beyond the guard time interval and the spectral splattering that results. Peak 502 represents the Fourier transform output of the delayed (or advanced) OFDM subcarrier. Note that the frequency bins on either side of the frequency bin containing the peak 502 are greatly effected by the group delay distortion, i.e., significant frequency bin splattering has occurred. Ideally, as is well known in the art, the frequency bins on either side should be at much lower level than illustrated. It is noted that the representation of FIG. 5A does not account for the effect of the following (k+1) OFDM symbol which would further destroy demodulation of the present $k^{th}$ symbol.

Figure 5B:
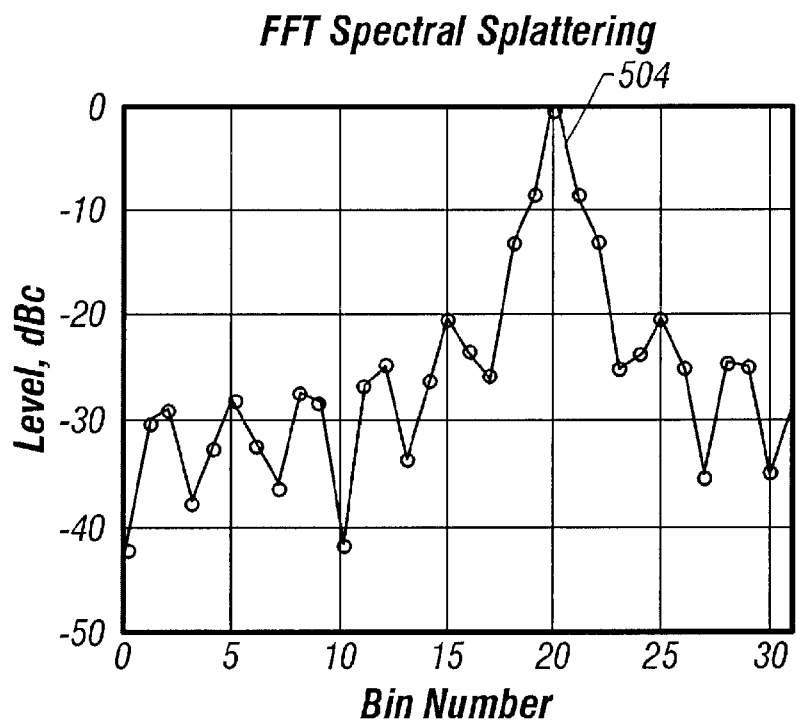
FIG. 5B is a graphical representation illustrating frequency bin splattering within a Fourier transform when one orthogonal frequency division multiplexed (OFDM) subcarrier is delayed (or advanced) 30% beyond the guard time interval.

Next, referring briefly to FIG. 5B, a graphical representation is shown which illustrates frequency bin splattering within a Fourier transform when the OFDM subcarrier of FIG. 5A is delayed (or advanced) 30% beyond the guard time interval. Again, as seen, peak 504 represents the delayed OFDM subcarrier. In this case, there is even a further pronounced frequency bin splattering (or spectral splattering) result. Again, the bins closest to the subcarrier are impaired the most; however, the impairment reaches further across the OFDM modulation spectrum than the example of FIG. 5A. In preferred embodiments, more than one subcarrier will be advanced or delayed such that the entire OFDM modulation spectrum is effected. Additionally, it is noted that the seriousness of the group delay distortion can be further increased by using a group delay distortion characteristic that has a more rapidly varying group delay characteristic versus frequency offset (see FIG. 9 below).

Next, in principle, an almost infinite number of different group delay characteristics could be drawn for these baseband all-pass filters 402 given the delay spread as defined above in Equations (3) and (4). Table 2 below shows suggested minimum values for $\sigma_\tau$ and the C/N ratio depending on the modulation format for OFDM communications using the IEEE 802.11a standard. It is noted that for other types of multiple carrier and single carrier modulations, the amount of group delay spread or $\sigma_\tau$ will vary, but still should follow the rule of Equation (4) above.

TABLE 2

| Constellation | C/N, dB | Minimum $\sigma_\tau$ |
|---|---|---|
| BPSK | −0.8 | 2.4 $\mu$sec |
| QPSK | 2.2 | 1.8 $\mu$sec |
| 16-QAM | 12.2 | 1.0 $\mu$sec |
| 64-QAM | 18.8 | 1.0 $\mu$sec |

Furthermore, in order to optimize the effective encryption performance, it is preferable that the filter characteristics are sufficiently different from each other that a would-be eavesdropper would have to track the change to a new filter characteristics for each MAC frame or loose signal synchronization or loose the signal altogether. This is further described below.

It is also noted that although in preferred embodiments, many all-pass filters 402 are cascaded, that minimally, a single all-pass filter at the transmitter and a single all-pass filter at the receiver that is the inverse of the all-pass filter at the transmitter are required to effect the signal encryption.

The following is an example of the design of the cascade 400 of all-pass filters 402. Any number of all-pass delay filters 402, also referred to as group delay dispersion filters, can be used in the signal encryption process and their design and use can be similarly varied to produce differing results. Regardless, all of these digital all-pass filters 402 can be mathematically represented by Eq (2).

In general, the encryption method utilizes a set of pre-computed random group delay dispersion filters 402 numbering from 1 to perhaps as high as 128 depending upon the level of encryption desired. In the general case where a large number of digital all-pass filters 402 are desired for the encryption process, the design procedure for these all-pass filters 402 consists of the following steps:

(1) Ideally limit the $\{c_i\}$ coefficient values to +1 and 0 in Eq (2) (making for a total possible number of all-pass filter combinations adequately small to permit an exhaustive search, e.g., approximately $4.3 \times 10^7$ for N=16);

(2) Decide upon a maximum peak-to-peak group delay variation that is allowed depending upon the level of encryption, e.g., data encryption only (e.g., +1 μsec for IEEE 802.11a) or data and preamble encryption (e.g., ±5 μsec for IEEE 802.11a);

(3) Decide upon a minimum energy dispersion standard deviation ($\sigma_\tau$ in Eq. (4)) which is again dependent upon the level of encryption desired;

(4) Exhaustively search the $\{c_i\}$ space, retaining those choices that meet the criteria just identified;

(5) From this reduced set of $\{c_i\}$ solutions, compute the subset of these solutions having the maximum distance from each other as defined by:

$$\text{Distance}(i, j) = \frac{\int_0^\infty S(f)[\tau_i(f) - \tau_j(f)]^2 df}{\int_0^\infty S(f) df} \quad \text{Eq. (5)}$$

where S(f) is the power spectral density, and $\tau_i(f)$ and $\tau_j(f)$ are the group delay distortions at frequency f for the pair of all-pass filters i and j;

(6) Retain the best N all-pass filter choices that together as a pair-by-pair set achieve this objective with the distance greater than a specified minimum.

Figure 6:
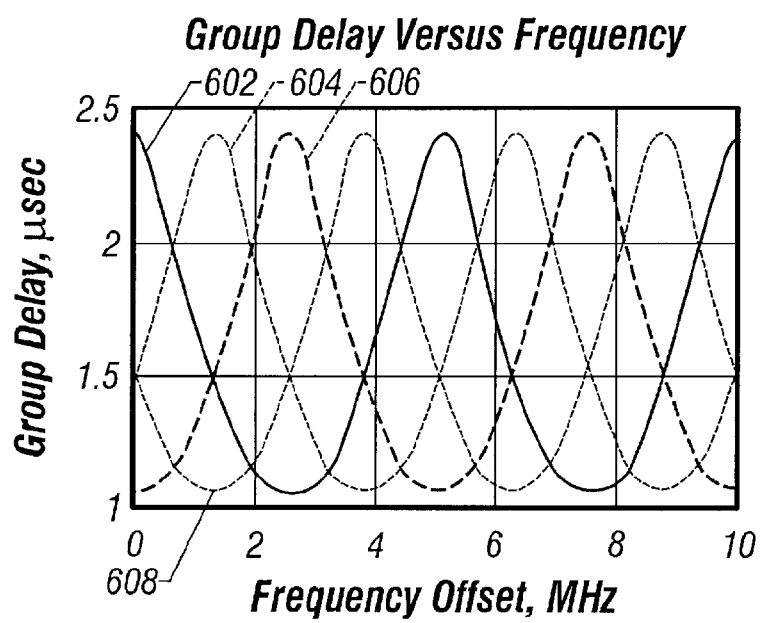
FIG. 6 is a graphical representation of the superimposed group delay characteristics for one embodiment of the dispersion filters of FIG. 4.

Referring next to FIG. 6, a graphical representation is shown of the superimposed group delay characteristics for one embodiment of the dispersion filters of FIG. 4. In a preferred embodiment, the cascade 400 of all-pass filters 402 for time dispersion signal encryption uses only 4 different digital filters, all of which are closely related. Each all-pass filter 402 uses a fair number of time delays, but only 2 (complex) tap weights or coefficients must be computed in each all-pass filter. The z-transform for the cascade 400 of all-pass filters 402 is represented by:

$$H(z, a, n, p) = \left[\frac{1 + az^{-n}}{a^* + z^{-n}}\right]^p \quad \text{Eq. (6)}$$

where $a_k$ is the tap weight or coefficient (also referred to as $C_i$), p is the number of cascaded all-pass filters 402, and n is the length of the delay in nsec (e.g., 25 or 50 nsec). Preferably, the sample rate is assumed to be 40 MHz, n=8, p=8, and $a_k=0.20^*\exp(j\ 2\pi k/4)$. The superimposed group delay characteristics for the 4 dispersion filters are shown in FIG. 6 as group delay characteristics 602, 604, 606 and 608.

Figure 7:
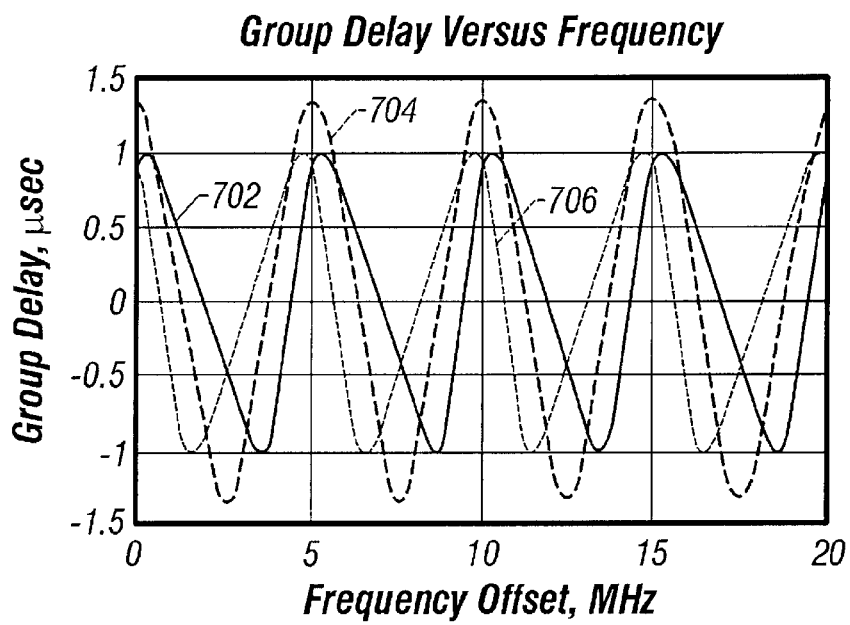
FIG. 7 is a graphical representation of an optimal all-pass filter design in which in the event a receiver chooses the wrong inverse filter to correct for the group delay distortion introduced at the transmitter, significant group delay distortion will still be present.

Referring next to FIG. 7, a graphical representation is shown of an optimal all-pass filter design in which in the event a receiver chooses the wrong inverse filter to correct for the group delay distortion introduced at the transmitter, significant group delay distortion will still be present. In order for the random frame-by-frame selection between the different dispersion filters to be effective for encryption purposes, if the receiver happens to choose the wrong inverse dispersion filter for a given frame, significant dispersion should still result. This measure can be investigated by comparing the group delay characteristics on a pair-wise basis (i.e., assume filter i for transmit but assume the inverse of filter j for receive where i j). All of the possible pairings were considered and the results for one pair of filters is illustrated in FIG. 7 as group delay characteristics 702, 704 and 706. Thus, as illustrated, if the receiver makes the wrong choice for the dispersion filter (inverse) to be used, serious group delay dispersion still results thereby affording good encryption properties.

Referring next to FIGS. 8–11, a level of time dispersion signal encryption which interferes with the reception of data as well as the reception of the preamble is discussed.

Figure 8:
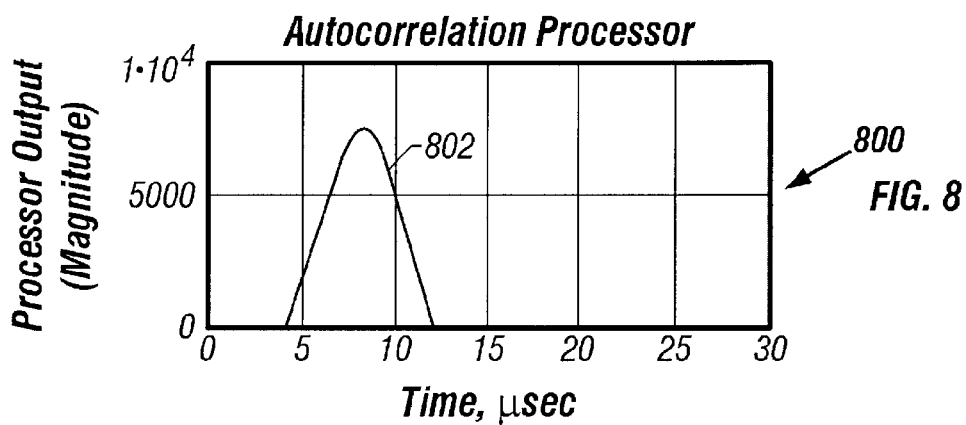
FIG. 8 is a graphical representation of an ideal output of an autocorrelation technique performed absent noise, for example, in the preamble detection of the receiver of FIG. 1, without transmission level encryption of FIG. 1.

Referring next to FIG. 8, a graphical representation is shown of an ideal output of an autocorrelation technique performed absent noise, for example, in the preamble detector 134 of the receiver 104 of FIG. 1, without any transmission level encryption. Without the time dispersion signal encryption of several embodiments of the invention, the receiver executes an autocorrelation algorithm, e.g., in the preamble detector 134 of the receiver 104 of FIG. 1. Using IEEE 802.11a, the short symbol portion 206 of the preamble uses short symbols in which every fourth OFDM carrier is utilized. As a result, the signal is periodic with a time period of 0.80 μsec. The length of the short symbol portion 206 is 8 μsec however, so unless the group delay dispersion is on the order of 4 μsec or more, the autocorrelation detection is still effective in detecting the preambles presence as well as the signals approximate frequency error. The graphical representation 800 of FIG. 8 is the autocorrelation output 802 in the absence of noise centered at 8 μsec.

Figure 9:
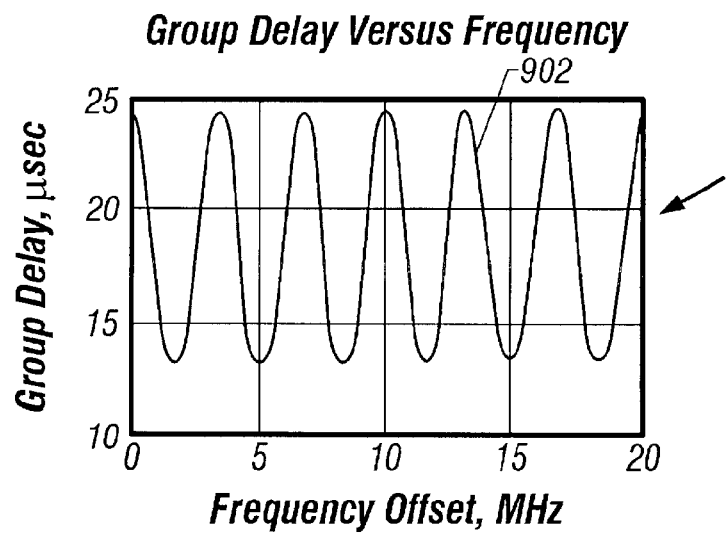
FIG. 9 is a graphical representation of a group delay distortion applied by the transmitter of the OFDM communication system of FIG. 1, in accordance with another embodiment of the invention.

Next, FIG. 9 is a graphical representation 900 of a group delay distortion 902 vs. the frequency offset applied by the transmitter of the communication system of FIG. 1, which is greater than at least half of the length of the preamble itself. For example, it is greater than 4.0 μsec for the IEEE 802.11a standard. This group delay distortion corresponds to a level of time dispersion signal encryption which will interfere not only with data reception, but with preamble detection and acquisition.

Figure 10:
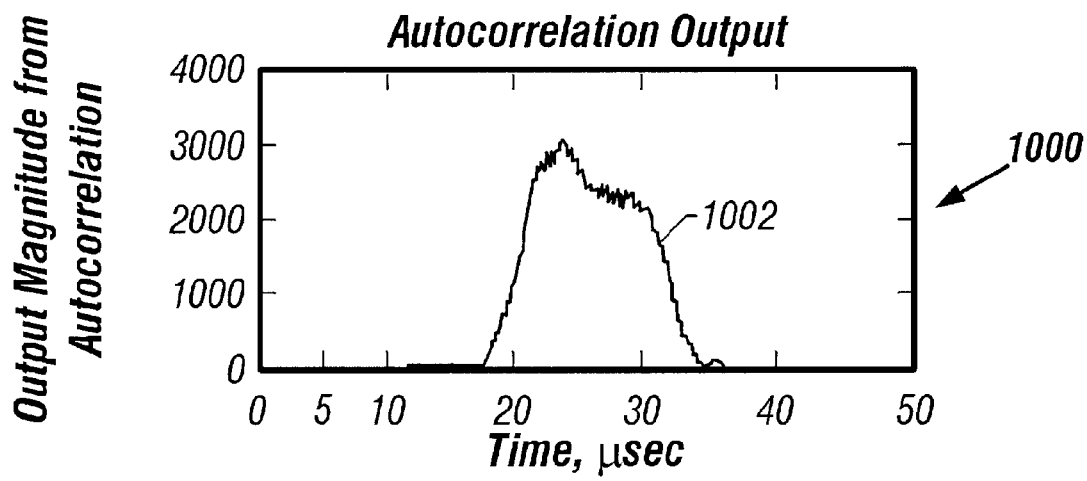
FIG. 10 is a graphical representation of the output of the autocorrelation algorithm used in the preamble detection of FIG. 1 given a group delay distortion according to FIG. 9.

Next, FIG. 10 is a graphical representation 1000 of the autocorrelation output 1002 of the autocorrelation algorithm used in the preamble detection of FIG. 1 given the group delay distortion 902 of FIG. 9. As illustrated, even absent noise, the autocorrelation peak is seriously dispersed with respect to the ideal autocorrelation output 802 of FIG. 8. The autocorrelation output 1002 lacks a distinct peak and is shifted in time from the desired location, e.g., the autocorrelation output 1002 is centered at approximately 25 μsec, compared to 8 μsec ideally. As such, the frequency error estimate will be severely degraded. Thus, this type of group delay distortion will not only interfere with the reception of data, but also disrupts the receiver's ability to obtain the preamble of the signaling.

Figure 11:
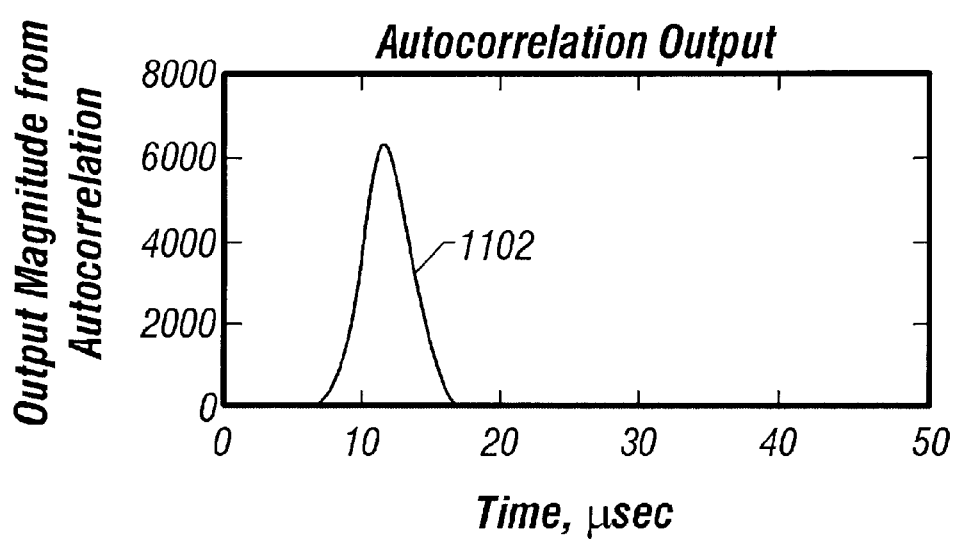
FIG. 11 is a graphical representation of the output of the autocorrelation algorithm used in the preamble detection of FIG. 1 in which a group delay distortion has been introduced that will interfere with data reception, but not preamble detection and acquisition.

Referring next to FIG. 11, a graphical representation 1100 is shown of the autocorrelation output 1102 of the autocorrelation algorithm used in the preamble detector of FIG. 1 in which only a slight group delay distortion has been introduced which will interfere with the reception of the data of the signaling but not with the reception of the preamble. For example, given a group delay distortion of +1 μsec, which is sufficient to smear the OFDM data symbols and their respective guard times together that the unauthorized receiver will suffer loss of orthogonality (see FIGS. 3A and 3B). At the same time, as can be seen, the impact on the preamble detection and acquisition is only slightly impaired. The autocorrelation output 1102 is very close in shape to the ideal autocorrelation output 802 of FIG. 8 and is only slightly shifted in time, e.g., by about 3 μsec.

Figure 12:
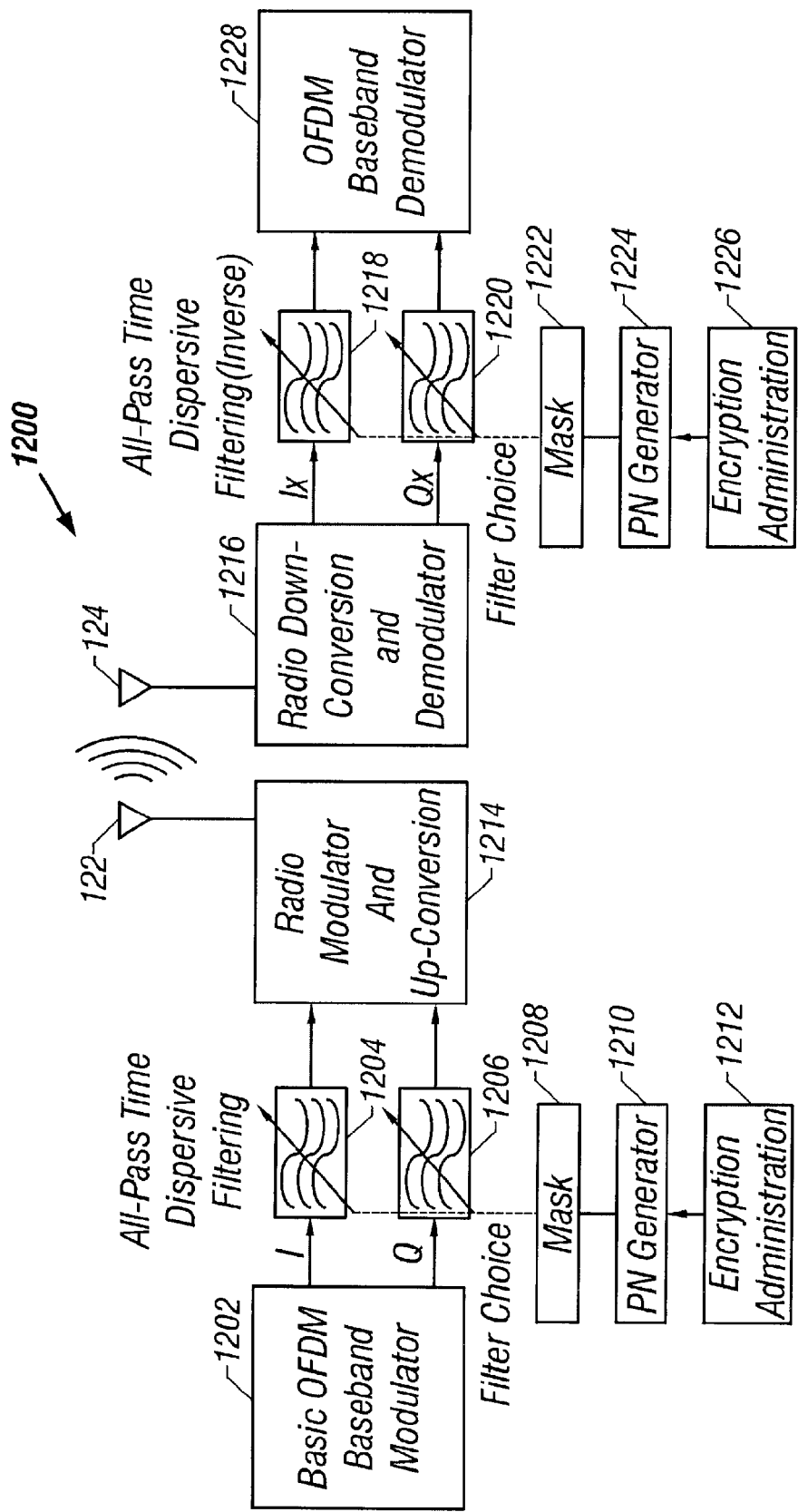
FIG. 12 is a functional block diagram of an orthogonal frequency division multiplexed (OFDM) communication system incorporating a group delay distortion encryption as a transmission-level security technique according to another embodiment of the invention.

Referring next to FIG. 12, a functional block diagram is shown of an orthogonal frequency division multiplexed (OFDM) communication system incorporating a group delay distortion encryption as a transmission-level security technique according to another embodiment of the invention. Illustrated is the OFDM communication system 1200 including a transmitter having an OFDM baseband modulator 1202, time dispersive filters 1204 and 1206, a mask 1208, a pseudo random number generator 1210 (also referred to as a PN generator 1210), an encryption administration 1212, an RF modulator and upconverter 1214, and a transmit antenna 122. The system also includes a receiver having a receive antenna 124, RF demodulator and downconverter 1216, time dispersive inverse filters 1218 and 1220, another mask 1222, another pseudo random number generator 1224 (also referred to as a PN generator 1224), and encryption administration 1226, and the OFDM baseband demodulator 1228.

The communication system 1200 of FIG. 12 is similar to the communication system of FIG. 1. For example, the OFDM baseband modulator 1202 includes the modulator 108, IFFT 110, cyclic prefix extension 112 and the preamble 114 of FIG. 1, while the time dispersive filters 1204 and 1206, the mask 1208, the PN generator 1210 and the encryption administration 1212 are contained within the signal encryptor 116 of FIG. 1. Likewise, in the receiver, the time dispersive inverse filters 1218 and 1220, the mask 1222, the PN generator 1224 and the encryption administration 1226 are part of the signal decryptor 130 of FIG. 1 and the OFDM baseband demodulator 1128 includes the cyclic prefix removal 132, the FFT 136 and the demodulator 138 of FIG. 1.

Again, this embodiment implements the introduction of a group delay distortion in the digital baseband signals, e.g., the I and Q signals, such that one or more of the carriers of the OFDM data symbols are advanced or delayed a predetermined amount. The encryption administration 1212 controls the level of distortion to be introduced as programmed. For example, a peak-to-peak variation of the group delay distortion greater than the guard time interval will interfere with an eavesdroppers ability to recover the data, although the eavesdropper will still be able to detect and acquire the preamble of the signaling. On the other hand, a much greater peak-to-peak variation in the group delay distortion, for example, greater than half of the portion of the preamble used for timing synchronization and frequency offset estimation (i.e., greater than half of the short symbol portion 206 or greater than 4 μsec for the IEEE 802.11a standard), will interfere with the eavesdroppers ability to receive both the data and the preamble.

The PN generator 1210 generates a pseudo random pattern of variable group delay commands to the time dispersive filters 1204 and 1206 to hop between on a frame-by-frame basis. The mask 1208 applies the appropriate translation between the output and the input parameters needed to control the time dispersive encryption filters. There is a separate time dispersive filter 1204 and 1206 for the I and Q digital baseband signals. Each time dispersive filter 1204 and 1206 is preferably a cascade of all-pass filters, such as illustrated and discussed with reference to FIGS. 4 through 6. There is a separate cascade of filters for both the In-phase (I) digital signals and the Quadrature-phase (Q) digital signals. Both of these cascades of all-pass filters may be differently delayed with respect to each other according to the encryption administration 1212, although preferably, both cascades of filters will be identical while varying the input parameters. The time dispersive filters 1204 and 1206 are linear all-pass filters that introduce a group delay distortion on one or more of the carriers for each OFDM data symbol. Then the baseband signals are modulated and upconverted at the RF modulator and upconverter 1214, as is conventionally done.

At the receiver, time dispersive inverse filters 1218 and 1220 are implemented to remove the group delay distortion that was introduced at the transmitter. The time dispersive all-pass filters 1218 and 1220 are designed to be the inverse of the time dispersive filters 1204 and 1206 at the transmitter. Furthermore, the encryption administration 1226 and the PN generator 1224 operate in tandem with their counterparts at the transmitter to cause the time dispersive inverse filters to hop between different all-pass inverse filters on a frame-by-frame basis in accordance with the group delay distortion hopping at the transmitter.

As such, once the signaling has passed through the time dispersive inverse filters 1218 and 1220, the signaling appears as normal OFDM signaling to the OFDM baseband demodulator 1228. A receiver without a corresponding time dispersive inverse filtering to remove the group delay distortions would not be able to receive the OFDM data symbols due to loss of orthogonality and depending on the level of group delay distortion introduced, may not be able to even receive the preamble of the signaling. This creates an effective transmission security at the PHY-layer.

Furthermore, since the filtering at the transmitter and the inverse filtering at the receiver comprise linear filters, there is no additional distortion or non-linearities introduced into the system. This has an advantage of making the filtering appear transparent to the communication system 1200. Additionally, if desired bit-level encryptions, such as DES, could be added on top of the time dispersive signal encryption used.

It is noted that in alternative embodiments, the group delay distortion as described throughout the specification may be applied at an intermediate frequency instead of in baseband, as is done by the time dispersive filters 1204. For example, the group delay distortion may be implemented using a bandpass filter at a non-zero intermediate frequency, e.g., located in the RF modulator and upconverter 1214. As such, a group delay distortion is introduced into the signals to be transmitted. A corresponding inverse bandpass filter is then required in the RF demodulator and downconverter 1216 to remove the group delay distortion. Thus, in these alternative embodiments, the group delay distortion is introduced at an intermediate frequency instead of introduced in baseband by the time dispersive filters 1204.

While the invention herein disclosed has been described by means of specific embodiments and applications thereof, numerous modifications and variations could be made thereto by those skilled in the art without departing from the scope of the invention set forth in the claims.

What is claimed is:

1. A method of transmission level security in a communication system comprising:

forming a plurality of digital signals representing a symbol to be transmitted over a communication medium, wherein respective ones of the plurality of digital signals are modulated onto respective ones of a plurality of subcarriers according to a multiple carrier modulation scheme; and introducing at a transmitter a predetermined group delay distortion in one or more of the plurality of subcarriers, such that portions of the one or more of the plurality of subcarriers will be received outside of a time window corresponding to the symbol at a receiver.

2. The method of claim 1 wherein the introducing comprises filtering the one or more of the plurality of subcarriers with one or more time dispersive all-pass filters.

3. The method of claim 1 wherein the forming comprises forming the plurality of digital signals representing the symbol, wherein the respective ones of the plurality of digital signals are modulated onto the respective ones of the plurality of subcarriers according to orthogonal frequency division multiplexed (OFDM) modulation.

4. The method of claim 1 wherein the introducing comprises introducing the predetermined group delay distortion in the one or more of the plurality of subcarriers, wherein the predetermined group delay distortion is sufficient to cause frequency bin splattering in a Fourier transform in the receiver.

5. The method of claim 1 wherein the introducing comprises introducing the predetermined group delay distortion in the one or more of the plurality of subcarriers, wherein the predetermined group delay distortion interferes with the signal processing of a preamble of a frame containing the symbol.

6. The method of claim 3 wherein the introducing comprises introducing the predetermined group delay distortion in the one or more of the plurality of subcarriers, wherein the peak-to-peak variation of the predetermined group delay distortion is greater than half of a short symbol portion of the preamble.

7. The method of claim 1 further comprising transmitting the plurality of subcarriers to the receiver.

8. The method of claim 7 further comprising converting, prior to said transmitting step, the plurality of subcarriers to radio frequency.

9. The method of claim 1 wherein the predetermined group delay distortion is selected from a plurality of predetermined group delay distortions.

10. The method of claim 9 wherein the predetermined group delay distortion is pseudo randomly selected from the plurality of predetermined group delay distortions.

11. The method of claim 9 wherein the predetermined group delay distortion is a different one of the plurality of predetermined group delay distortions than selected for a previous symbol.

12. The method of claim 11 wherein the predetermined group delay is the different one of the plurality of predetermined group delay distortions than selected for a previous symbol of a previous frame.

13. The method of claim 1 wherein the introducing comprises introducing the predetermined group delay distortion in less than all of the plurality of subcarriers.

14. The method of claim 1 wherein a peak-to-peak variation of the predetermined group delay distortion is greater than a guard time interval corresponding to the symbol.

15. The method of claim 1 wherein the introducing comprises introducing the predetermined group delay distortion in the one or more of the plurality of subcarriers, wherein the predetermined group delay distortion is sufficient to cause a loss of orthogonality in the receiver.

16. The method of claim 1 wherein the introducing comprises introducing the predetermined group delay distortion in the one or more of the plurality of subcarriers, wherein the predetermined group delay distortion is sufficient to cause intersymbol interference between adjacent symbols at the receiver.

17. A transmission level security system for communications systems comprising:

means for forming a plurality of digital signals representing a symbol to be transmitted over a communication medium, wherein respective ones of the plurality of digital signals are modulated onto respective ones of a plurality of subcarriers according to a multiple carrier modulation scheme; and means for introducing at a transmitter a predetermined group delay distortion in one or more of the plurality of subcarriers, such that portions of the one or more of the plurality of carriers will be received outside of a time window corresponding to the symbol at a receiver.

18. The system of claim 17 wherein the means for introducing comprise means for time-dispersive filtering the one or more of the plurality of subcarriers.

19. The system of claim 17 wherein the means for introducing comprise means for introducing the predetermined group delay distortion in the one or more of the plurality of subcarriers, wherein the predetermined group delay distortion is sufficient to cause frequency bin splattering in a Fourier transform in the receiver.

20. The system of claim 17 wherein the means for introducing comprise means for introducing the predetermined group delay distortion in the one or more of the plurality of subcarriers, wherein the predetermined group delay distortion interferes with the signal processing of a preamble of a frame containing the symbol.

21. The system of claim 17 wherein a peak-to-peak variation of the predetermined group delay distortion is greater than a guard time interval corresponding to the symbol.

22. The system of claim 17 wherein the predetermined group delay distortion is selected from a plurality of predetermined group delay distortions.

23. The system of claim 22 wherein the predetermined group delay distortion is a different one of the plurality of predetermined group delay distortions than selected for a previous symbol.

24. The system of claim 17 wherein the means for introducing comprises means for introducing the predetermined group delay distortion in the one or more of the plurality of subcarriers, wherein the predetermined group delay distortion is sufficient to cause a loss of orthogonality in the receiver.

25. A method of transmission level security in a communication system comprising:

forming a plurality of digital signals representing a symbol to be transmitted over a communication medium, wherein respective ones of the plurality of digital signals are modulated onto respective ones of a plurality of subcarriers according to a multiple carrier modulation scheme; and introducing at a transmitter a group delay distortion in one or more of the plurality of subcarriers but less than all of the plurality of subcarriers, such that portions of the one or more of the plurality of subcarriers will be received outside of a time window corresponding to the symbol at a receiver.

26. The method of claim 25 wherein the introducing comprises introducing a predetermined group delay distortion in the one or more of the plurality of subcarriers but less all of the plurality of subcarriers.

27. The method of claim 25 wherein the introducing comprises introducing the group delay distortion in the one or more of the plurality of subcarriers, wherein the group delay distortion is sufficient to cause a loss of orthogonality in the receiver.

28. A method of transmission level security in a communication system comprising:

forming a signal to be transmitted over a communication medium; and introducing at a transmitter a predetermined group delay distortion in the signal, such that portions of the signal will be received outside of a time window corresponding to the signal at a receiver.

29. The method of claim 28 wherein the predetermined group delay distortion will cause sufficient signal energy to be dispersed in time outside of the time window corresponding to the signal at the receiver, wherein frequency bin splattering will occur in a Fourier transform of the receiver.

30. The method of claim 28 wherein the signal comprises a plurality of subcarriers representing a symbol, wherein the introducing comprising introducing the predetermined group delay distortion in one or more of the plurality of subcarriers.

31. The method of claim 30 wherein the introducing comprises introducing the predetermined group delay distortion in less than all of the plurality of subcarriers.

32. The method of claim 28 wherein the predetermined group delay distortion is selected from a plurality of predetermined group delay distortions.

33. The method of claim 32 wherein the predetermined group delay distortion is pseudo randomly selected from the plurality of predetermined group delay distortions.

34. The method of claim 32 wherein the predetermined group delay distortion is a different one of the plurality of predetermined group delay distortions than selected for a previous signal.

35. The method of claim 34 wherein the predetermined group delay distortion is the different one of the plurality of predetermined group delay distortions than selected for a previous signal of a previous frame.

36. The method of claim 28 wherein the introducing comprises introducing the predetermined group delay distortion, wherein the predetermined group delay distortion is sufficient to cause a loss of orthogonality in the receiver.

37. The method of claim 28 wherein the predetermined group delay distortion is sufficient to cause intersymbol interference between adjacent symbols at the receiver.

38. The method of claim 28 wherein the signal comprises an orthogonal frequency division multiplexed (OFDM) signal.

39. The method of claim 28 wherein the signal comprises a single carrier signal.

40. The method of claim 28 further comprising;

transmitting the signal to the receiver;

receiving the signal at the receiver, and substantially removing the predetermined group delay distortion such that the portions of the signal will be received within the time window corresponding to the signal at the receiver.

41. The method of claim 40 wherein the substantially removing comprises applying an inverse of the predetermined group delay distortion to the received signal.

42. A method of transmission level security for time windowed communication systems comprising:

receiving a signal, wherein the signal has undergone a predetermined group delay distortion at a transmitter, wherein the predetermined group delay distortion is such that portions of the signal will be received outside of a nominal window of time corresponding to the signal at a receiver; and substantially removing the predetermined group delay distortion from the signal such that the signal fits within the nominal window of time.

43. The method of claim 42 wherein the predetermined group delay distortion is such that sufficient signal energy will be received Outside of a nominal window of time corresponding to the signal such that will cause frequency bin splattering in a Fourier transform.

44. The method of claim 42 wherein the substantially removing comprises applying an inverse of the predetermined group delay distortion to the received signal.

45. The method of claim 44 wherein the substantially removing comprises filtering the signal with a time dispersive all-pass filter.

46. The method of claim 42 wherein the receiving comprises receiving a signal comprising a plurality of subcarriers, wherein one or more of the plurality of subcarriers have undergone the predetermined group delay distortion;

wherein the substantially removing comprises substantially removing the predetermined group delay distortion from the one or more of the plurality of subcarriers.

47. The method of claim 46 wherein the signal comprises an orthogonal frequency division multiplexed (OFDM) signal.

48. The method of claim 42 wherein the receiving comprises receiving a single carrier signal having undergone the predetermined group delay distortion.

49. The method of claim 42 wherein the predetermined group delay distortion is sufficient to cause a loss of orthogonality in the receiver;

wherein the substantially removing comprises substantially removing the predetermined group delay distortion from the signal such that orthogonality is maintained in the receiver.

50. The method of claim 42 wherein the predetermined group delay distortion is sufficient to cause intersymbol interference between adjacent symbols in the receiver;

wherein the substantially removing comprises substantially removing the predetermined group delay distortion from the signal such that the intersymbol interference due to the predetermined group delay distortion is removed.

51. The method of claim 42 wherein the predetermined group delay distortion is selected from a plurality of predetermined group delay distortions.

52. A transmitter implementing transmission level security for wireless communications comprising:
   a baseband modulator producing a signal to be transmitted to a receiver; and
   an encryptor coupled to the baseband modulator for introducing a predetermined group delay distortion in the signal such that portions of the signal will be received outside of a nominal window of time corresponding to the signal at the receiver.

53. The transmitter of claim 52 wherein the predetermined group delay distortion introduced by the encryptor will cause sufficient signal energy to be dispersed in time outside of the nominal window of time corresponding to the signal at the corresponding receiver.

54. The transmitter of claim 52 wherein the encryptor comprises a time dispersive all-pass filter.

55. The transmitter of claim 52 further comprising a radio frequency modulator and upconverter coupled to the signal encryptor.

56. The transmitter of claim 52 wherein the predetermined group delay distortion will cause frequency bin splattering to occur in a Fourier transform of the receiver.

57. The transmitter of claim 52 wherein the encryptor selects the predetermined group delay distortion from a plurality of predetermined group delay distortions.

58. The transmitter of claim 52 wherein the predetermined group delay distortion is sufficient to cause a loss of orthogonality in the receiver.

59. The transmitter of claim 52 wherein the predetermined group delay distortion is sufficient to cause intersymbol interference between adjacent symbols at the receiver.

60. The transmitter of claim 52 wherein the signal comprises a plurality of subcarriers;
   wherein the encryptor introduces the predetermined group delay distortion in one or more of the plurality of subcarriers.

61. The transmitter of claim 52 wherein the signal comprises a single carrier signal;
   wherein the encryptor introduces the predetermined group delay distortion in the single carrier signal.

62. A receiver implementing transmission level security for wireless communications comprising:
   an antenna for receiving a signal, wherein the signal has been undergone a predetermined group delay distortion at a transmitter such that portions of the signal will be received outside of a nominal window of time corresponding to the signal at the receiver;
   a downconverter coupled to the antenna; and
   a decryptor coupled to the downconverter for substantially removing the predetermined group delay distortion from the signal such that the signal fits within the nominal window of time.

63. The receiver of claim 62 wherein the decryptor substantially removes the predetermined group delay distortion by applying an inverse of the predetermined group delay distortion to the received signal.

64. The receiver of claim 62 wherein the predetermined group delay distortion is selected from a plurality of predetermined group delay distortions;
   wherein the decryptor substantially removes the predetermined group delay, distortion by applying an inverse of the selected one of the plurality of predetermined group delay distortions to the received signal.

65. The receiver of claim 62 wherein the predetermined group delay distortion of the received signal is such that sufficient signal energy will be received outside of the nominal window of time and will cause frequency bin splattering in a Fourier transform.

66. The receiver of claim 62 wherein the decryptor comprises a time dispersive all-pass filter.

67. The receiver of claim 62 further comprising a Fourier transform coupled to the decryptor.

68. The receiver of claim 62 wherein the signal comprising a plurality of subcarriers, wherein one or more of the plurality of subcarriers have undergone the predetermined group delay distortion;
   wherein the decryptor substantially removes the predetermined group delay distortion from the one or more of the plurality of subcarriers.

69. The receiver of claim 62 wherein the signal comprises a single carrier signal having undergone the predetermined group delay distortion.

70. The receiver of claim 62 wherein the predetermined group delay distortion is sufficient to cause a loss of orthogonality in the receiver;
   wherein the decryptor substantially removes the predetermined group delay distortion from the signal such that orthogonality is maintained in the receiver.

71. The receiver of claim 62 wherein the predetermined group delay distortion is sufficient to cause intersymbol interference between adjacent symbols in the receiver;
   wherein the decryptor substantially removes the predetermined group delay distortion from the signal such that the intersymbol interference due to the predetermined group delay distortion is removed.

72. A method of transmission level security in a communication system comprising:
   forming signals to be transmitted over a communication medium;
   introducing at a transmitter a predetermined group delay distortion in each of the signals, such that portions of the signals will be received outside of a nominal time window corresponding to the signals at a receiver, the predetermined group delay distortion selected from a plurality of predetermined group delay distortions; and
   changing the predetermined group delay distortion introduced in at least one of the signals to another one of the plurality of predetermined group delay distortions.

73. The method of claim 72 further comprising repeating the changing step.

74. The method of claim 72 wherein the changing comprises changing periodically the predetermined group delay distortion introduced in at least one of the signals to respective ones of the plurality of predetermined group delay distortions.

75. The method of claim 74 wherein the changing comprises changing the predetermined group delay distortion introduced in at least one of the signals to respective ones of the plurality of predetermined group delay distortions on a frame-by-frame basis.

76. The method of claim 72 wherein the changing comprises changing periodically the predetermined group delay distortion introduced in at least one of the signals to pseudo randomly selected ones of the plurality of predetermined group delay distortions.

77. The method of claim 72 wherein each of the signals comprises a plurality of subcarriers;
   wherein the introducing comprises introducing the predetermined group delay distortion in one or more of the plurality of subcarriers.

78. The method of claim 72 wherein each of the signals comprises a single carrier signal;

wherein the introducing comprises introducing the predetermined group delay distortion in the carrier single.

79. The method of claim 72 wherein the introducing comprises introducing the predetermined group delay distortion, wherein the predetermined group delay distortion is sufficient to cause a lose of orthogonality in the receiver.

80. The method of claim 72 wherein the predetermined group delay distortion is sufficient to cause intersymbol interference between adjacent symbols at the receiver.

81. The method of claim 72 wherein the predetermined group delay distortion will cause frequency bin splattering in a Fourier transform of the receiver.

82. The method of claim 72 further comprising:

transmitting the signals to the receiver;

receiving the signals at the receiver; and substantially removing the predetermined group delay distortion such that the portions of the signals will be received within the time window corresponding to the signals at the receiver.

83. The method of claim 82 wherein the substantially removing comprises applying a respective inverse of the predetermined group delay distortion to each of the received signals.

84. A method of transmission level security in a communication system comprising:

forming signals to be transmitted over a communication medium; and introducing at a transmitter a predetermined group delay distortion in each of the signals, such that portions of the signals will be received outside of a nominal time window corresponding to the signals at a receiver, the predetermined group delay distortion selected from a plurality of predetermined group delay distortions;

wherein the predetermined group delay distortion introduced is hopped between respective ones of the plurality of predetermined group delay distortions.

85. The method of claim 84 wherein the predetermined group delay distortion introduced is hopped between pseudo randomly selected ones of the plurality of predetermined group delay distortions.

86. The method of claim 84 wherein the predetermined group delay distortion introduced is periodically hopped between respective ones of the plurality of predetermined group delay distortions.

87. The method of claim 84 wherein the predetermined group delay distortion introduced is periodically hopped between respective ones of the plurality of predetermined group delay distortions on a frame-by-frame basis.

* * * * *